(12) United States Patent
Komperla et al.

(10) Patent No.: US 10,951,609 B2
(45) Date of Patent: Mar. 16, 2021

(54) SYSTEM TO EFFECTIVELY VALIDATE THE AUTHENTICATION OF OTP USAGE

(71) Applicant: International Business Machines Corporation, Armonk, NY (US)

(72) Inventors: Parthasarthi Komperla, Bangalore (IN); Sharath Kumar Aithal, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 47 days.

(21) Appl. No.: 16/180,308

(22) Filed: Nov. 5, 2018

(65) Prior Publication Data

US 2020/0145408 A1 May 7, 2020

(51) Int. Cl.
*H04L 29/06* (2006.01)
*H04L 9/32* (2006.01)
*G06Q 20/40* (2012.01)

(52) U.S. Cl.
CPC ... *H04L 63/0838* (2013.01); *G06Q 20/40145* (2013.01); *H04L 9/3213* (2013.01); *H04L 63/0861* (2013.01)

(58) Field of Classification Search
CPC ............... H04L 63/0838; H04L 9/3213; H04L 63/0861
USPC ......................................................... 713/186
See application file for complete search history.

(56) References Cited

U.S. PATENT DOCUMENTS

| 5,680,460 A | 10/1997 | Tomko |
| 5,832,901 A | 11/1998 | Yoshida |
| 6,219,794 B1 | 4/2001 | Soutar |
| 9,648,015 B1 | 5/2017 | Avetisov |
| 9,906,525 B1 | 2/2018 | Avetisov |
| 2007/0067828 A1* | 3/2007 | Bychkov ............. H04L 63/0838 726/3 |
| 2013/0124855 A1* | 5/2013 | Varadarajan ............ G07F 19/20 713/155 |
| 2013/0268444 A1 | 10/2013 | Namgoong et al. |
| 2015/0026479 A1 | 1/2015 | Yi et al. |

(Continued)

FOREIGN PATENT DOCUMENTS

| KR | 20170088797 A | 8/2017 |
| KR | 20170124953 A | 11/2017 |
| WO | WO 2014141263 | * 9/2014 |

*Primary Examiner* — Eleni A Shiferaw
*Assistant Examiner* — Angela R Holmes
(74) *Attorney, Agent, or Firm* — Isaac J. Gooshaw; William H. Hartwell

(57) ABSTRACT

A biometrically encrypted access policy is provided. A commercial transaction request to access a client-supported institution received from a client device is identified. A database structure associates each of a plurality of client-supported institutions with one or more respective biometric tokens for authentication. A one-time password is associated with the client-supported institution based on biometric tokens. An encrypted code is associated with the client-supported institution based on biometric tokens. A encrypted OTP is transmitted to client device, and instructions to capture a biometric scan data via the client device are generated based on parameters of biometric tokens. A decryption key is generated via the client device, and the decryption key is determined to authenticate the user of the client device, and, in response, the commercial transaction request to access the client-support institution is approved.

14 Claims, 5 Drawing Sheets

(56) References Cited

U.S. PATENT DOCUMENTS

2015/0169860 A1  6/2015  Kim
2017/0264599 A1  9/2017  O'Regan et al.

* cited by examiner

SYSTEM TO EFFECTIVELY VALIDATE THE AUTHENTICATION OF OTP USAGE

BACKGROUND OF THE INVENTION

The present invention relates generally to the field of methods and devices for secure transactions of information, and more particularly to authorization and authentication methods and systems using biometrics.

As technology has evolved, the prevalence of electronic commerce transactions has increased. For example, through the use of mobile phones and computing equipment, large numbers of commercial requests and transactions are conducted every day. As the popularity of online retail transactions has increased, there has been a proportionate emphasis placed on the security of such transactions. Online transaction requests may require personal identifying information to be supplied in a digital form in order to authenticate a user and complete a transaction. In contrast, identity verification for an in-person transaction can be accomplished by the user producing an ID card with a photograph of the user or by a hand-written signature being produced by the person making the purchase.

SUMMARY

Embodiments of the present invention provide a method, system, and program product to biometrically authenticate a commercial transaction request from a user of a client device.

A first embodiment encompasses a method for executing a biometrically encrypted access policy. One or more processors generate an encrypted version of a one-time password using (i) biometric data of a user and (ii) the one-time password stored at a security provider that secures data. The one or more processors identify receipt of a decrypted version of the one-time password from a client device of the user. The one or more processors authorize the client device to access a data that is secured by the institution based on a determination of a match between the decrypted version of the one-time password and the one-time password.

A second embodiment encompasses a computer program product for executing a biometrically encrypted access policy. The computer program product includes one or more computer-readable storage media and program instructions stored on the one or more computer-readable storage media. The program instructions include program instructions to generate an encrypted version of a one-time password using (i) biometric data of a user and (ii) the one-time password stored at a security provider that secures data. The program instructions include program instructions to identify receipt of a decrypted version of the one-time password from a client device of the user. The program instructions include program instructions to authorize the client device to access a data that is secured by the institution based on a determination of a match between the decrypted version of the one-time password and the one-time password.

A third embodiment encompasses a computer system for executing a biometrically encrypted access policy. The computer system includes one or more computer processors, one or more computer readable storage medium, and program instructions stored on the computer readable storage medium for execution by at least one of the one or more processors. The program instructions include program instructions to generate an encrypted version of a one-time password using (i) biometric data of a user and (ii) the one-time password stored at a security provider that secures data. The program instructions include program instructions to identify receipt of a decrypted version of the one-time password from a client device of the user. The program instructions include program instructions to authorize the client device to access a data that is secured by the institution based on a determination of a match between the decrypted version of the one-time password and the one-time password.

DETAILED DESCRIPTION

Figure 1:
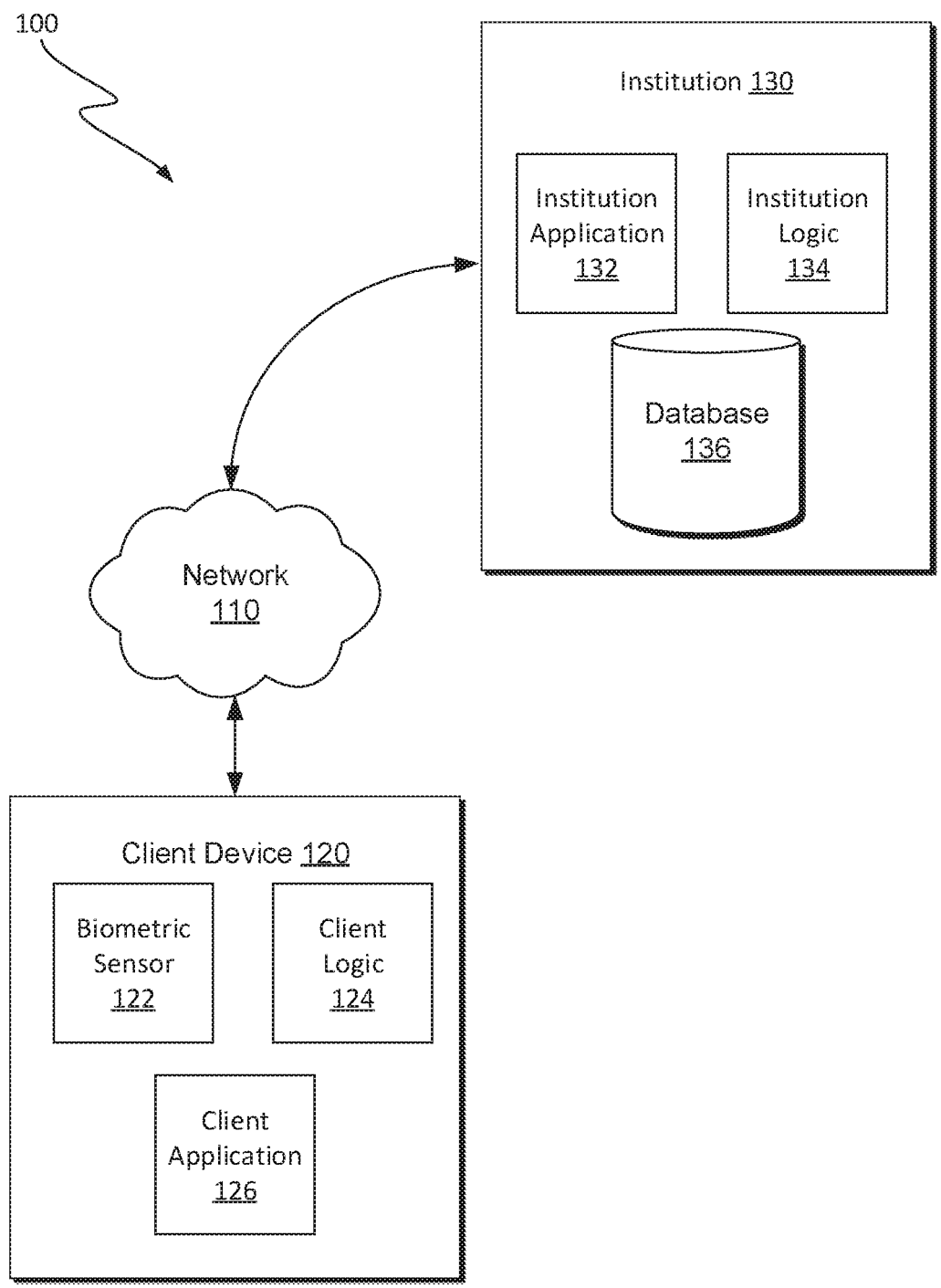
FIG. 1 is a functional block diagram illustrating a computing environment, in which a biometrically encrypted access policy is utilized, in accordance with an exemplary embodiment of the present invention.

Detailed embodiments of the present invention are disclosed herein with reference to the accompanying drawings. It is to be understood that the disclosed embodiments are merely illustrative of potential embodiments of the present invention and may take various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

While possible solutions to biometric encryption are known, these solutions may be inadequate to provide the necessary security for a user's information, because these solutions often require biometric data be stored locally on a user's device. Further, the user's passcodes and biometric data are susceptible to loss or theft either through interception during transmission of that data during a verification process or by theft of the user's device.

Embodiments of the present invention recognize that online requests and transactions generally require authentication and the transferring of confidential information, which can be a major hindrance on the global application and use of these online requests and transactions. Commercial businesses, banks, and institutions often require confirmation that the customers, which they conduct business with, are who they say they are. In addition, customers typically want to know that their personal and confidential information is secure and is not exposed for interception or cannot be tampered with by various forms of cyber-attack.

In general, authentication is the method of verifying the identity of the user, as an example, by a username and static password. Static passwords are the most popular authentication method available, however it is the least secure method. One-time passwords and biometrics offer a more unique and secure solution for the authentication process. Certain known approaches to improve customer authentication may include manual entry and transmission of passwords and other identification data at the point of sale. This approach can require a difficult key distribution mechanism for the customer, or an unacceptable level of participation from an untrusted sales agent.

As an example, online shopping and e-wallets have become more widely used and recognized and can provide remote access to a user's personal identifying information. Online banking can also provide remote access to account information, bill payments, account transfer, and even stock trading.

In today's modern world, of detached commercial requests and transactions, the issue presented is how to authenticate, authorize, and prevent personal and confidential information from being exposed to malicious third-parties while using a wireless or other mobile and computing device. In addition to authentication methods, another challenge is to prevent the user's personal identifying information from being stored on a wireless, mobile and computing device.

While authentication methods have evolved over the years, most solutions focus on how to transmit an unencrypted one-time password or a registered biometric over a network. These authentication methods offer limited protection to the user and the transmissions can be intercepted or tampered with while the information is en-route. Without the addition of biometry or other personal identifying information it may be impossible to confirm whether the user is the authorized user.

A problem remains with wireless or detached requests insofar as unauthorized third parties could maliciously intercept and tamper with personal and confidential information associated with a transaction. Therefore, parties to the transaction often seek to ensure that third parties cannot access or use authenticating information through wireless networks, phone link, phone line to create a fraudulent request or transaction or tamper with an existing request or transaction.

Recently, technology called "One-time password" or "OTP" has been adopted by many commercial businesses, banks, and institutions for remote online transactions. This technology is similar to static passwords, as static passwords are used alongside OTPs for authentication. However, OTPs are generated dynamically through a hardware token or software. During each request or transaction, the user to the transaction uses an OTP system to generate a unique multi-digit PIN. In subsequent requests or transactions another unique PIN is generated. However, when such an approach is applied to wireless computing devices, it allows the user of that wireless computing device to be susceptible to malicious third parties. Furthermore, the system fails if the user loses the OTP device or the malicious third parties intercept the transmission.

There are two concerns with certain methods of passcode security. First, the security of a cryptographic key, and hence the cipher system, is only as good as the passcode. Due to practical problems of remembering various passcodes, some users tend to choose simple words, phrases, or easily remembered personal data, while others resort to writing the passcode down on an accessible document to avoid data loss. As such, these types of methods pose different types of potential security risks. One aspect of concern is directed to the lack of direct connection between the passcode and the user. Because a passcode is not tied to a user, the system running the cryptographic algorithm is typically unable to differentiate between the legitimate user and an attacker who fraudulently acquires the passcode of a legitimate user.

As an alternative to the aforementioned passcode protection approaches, biometric encryption offers a new mechanism for key security by using a biometric to secure the cryptographic key. Instead of entering a more vulnerable passcode or static password to access the cryptographic key, the use of the cryptographic key is guarded by biometric authentication. When a user wishes to request a commercial transaction, they are prompted to allow the capture of a biometric sample. If this verification sample matches the enrollment template, then the cryptographic key is released, and can be used to encrypt or decrypt the desired data. Thus, biometric authentication can, at least in part, replace the use of passcodes to secure a cryptographic key. Such an approach often yields an increase in the level of security, since only the valid user can release the key. Further, consistency is also often increased, since the user no longer is required to remember a passcode. Embodiments of the present invention recognize that the same biometric data be gathered for both encryption and subsequent decryption and that variations may exist between biometric data gathered from the same individual. For example, a user takes two different fingerprint readings and the fingerprints are read from two slightly different angles. An embodiment thus uses the distance between points and ridges of the fingerprint with a margin of variability such that the difference in angles is accounted for when generating maps of the fingerprints and the maps correlate to one another. As such, embodiments of the present invention provide a version of biometric data that can be matched to biometric data gathered by a sensor on a device of a user. In another example, color patterns in the iris of the eye are used to orient data for a retinal scan. Embodiments of the present invention recognize that certain biometric data may change over time and thus the user may be required to provide an updated version of their biometric data periodically based on a prediction that the biometric data has "aged" to a point where there is an increased chance that a mismatch will be detected between the data provided at a device of a given user and biometric data that is stored.

The present invention will now be described in detail with reference to the Figures.

FIG. 1 is a functional block diagram illustrating a computing environment, generally designated 100, in accordance with one embodiment of the present invention. Computing environment 100 includes institution 130 and client device 120 connected over network 110. Institution 130 includes institution logic 134. Client device 120 includes client logic 124. Institution logic 134 and client logic 124 include program instructions to perform the functions of the invention as described herein.

In various embodiments of the present invention, institution 130 is a computing device that can be a standalone device, a server, a laptop computer, a tablet computer, a netbook computer, a personal computer (PC), or a desktop computer. In another embodiment, institution 130 represents a computing system utilizing clustered computers and components to act as a single pool of seamless resources. In general, institution 130 can be any computing device or a combination of devices with access to client device 120 and network 110 and is capable of executing institution application 132. Institution 130 may include internal and external hardware components, as depicted and described in further detail with respect to FIG. 1.

In this exemplary embodiment, institution application 132 and institution logic 134 are stored on database 136. However, in other embodiments, institution application 132 and institution logic 134 may be stored externally and accessed through a communication network, such as network 110. Network 110 can be, for example, a local area network (LAN), a wide area network (WAN) such as the Internet, or a combination of the two, and may include wired, wireless, fiber optic or any other connection known in the art. In general, network 110 can be any combination of connections and protocols that will support communications between institution 130 and client device 120, in accordance with a desired embodiment of the present invention.

In various embodiments of the present invention, client device 120 is a computing device that can be a standalone device, a server, a laptop computer, a tablet computer, a netbook computer, a personal computer (PC), or a desktop computer. In another embodiment, client device 120 represents a computing system utilizing clustered computers and components to act as a single pool of seamless resources. In general, client device 120 can be any computing device or a combination of devices with access to institution 130 and network 110 and is capable of executing client application 126. Client device 120 may include internal and external hardware components, as depicted and described in further detail with respect to FIG. 1.

In this exemplary embodiment, client application 126 and client logic 124 are stored on client device 120. However, in other embodiments, client application 126 and client logic 124 may be stored externally and accessed through a communication network, such as network 110. Network 110 can be, for example, a local area network (LAN), a wide area network (WAN) such as the Internet, or a combination of the two, and may include wired, wireless, fiber optic or any other connection known in the art. In general, network 110 can be any combination of connections and protocols that will support communications between institution 130 and client device 120, in accordance with a desired embodiment of the present invention.

FIG. 1 is a functional block diagram illustrating a computing environment in which encrypted/decrypted biometric OTP access policies are utilized, in accordance with an embodiment of the present invention. For example, FIG. 1 is a functional block diagram illustrating computing environment 100 that includes client device 120 and institution 130, which are communicatively connected via network 110. In general, embodiments recognize that a variety of institutions, financial or otherwise, may provide OTPs to clients and that a variety of requests from a client may initiate the generation, encryption, and transmission of the encrypted OTP, by an institution, to a given client for verification, authentication, and/or permission granting purposes. Institution 130 represents various elements of an information technology infrastructure of an entity or organization that utilizes encrypted/decrypted biometric OTP control policies to manage commercial transaction(s). Institution 130 includes institution application 132 that executes institution logic 134 to, at least in part, manage access to institution 130, and database 136 stores data (i.e., biometric data, application data, logic data, and/or metadata). Institution 130 can include additional elements for provisioning and/or managing institution 130 and client device 120.

In various embodiments of the present invention, institution 130 and client device 120 are, respectively, a computing device that can be a standalone device, a server, a laptop computer, a tablet computer, a netbook computer, a personal computer (PC), a desktop computer, or video game console. In another embodiment, institution 130 and client device 120 represent a computing system utilizing clustered computers and components to act as a single pool of seamless resources. In general, institution 130 and client device 120 can be any computing device or a combination of devices with access to network 110 and institution application 132, institution logic 134, database 136, biometric sensor 122, client logic 124, and client application 126, and is capable of executing institution application 132, institution logic, client logic 124, and client application 126. Institution 130 may include internal and external hardware components, as depicted and described in further detail with respect to FIG. 5.

Institution logic 134 is depicted in FIG. 1 for illustrative simplicity, institution 130, however, can include any number of logics that are managed in accordance with institution application 132. In general, institution logic 134 represents a physical or virtual resource to which the entity or organization represented by institution 130 wishes to manage access. In some embodiments, institution logic 134 represents information and institution application 132 manages the ability to view the information. In other embodiments, institution logic 134 represents code that provides an ability to take specific action with respect to another physical or virtual resource and institution application 132 manages the ability to take such actions. In yet other embodiments, institution logic 134 represents control over a physical or virtual resource and institution application 132 manages the ability to use and modify the resource. Institution logic 134 can also represent any combination of the aforementioned elements. To illustrate various aspects of the present invention, examples of institution logic 134 are presented in which institution logic 134 represents one or more of: a commercial transaction, a financial transaction, or a user profile transaction, are presented, but embodiments of institution logic 134 are not limited thereto. Embodiments of the present invention recognize that institution logic 134 may include other forms of transactions that are known in the art.

In the embodiment depicted in FIG. 1, institution logic 134 utilizes, at least in part, data stored on database 136 to manage access to institution application 132 in response to commercial transaction requests received from client device 120 (i.e., from user of client device 120, alternatively referred to herein as a "requestor"). More specifically, institution logic 134 defines a resource hierarchy that represents various biometric authentications and that associates certain biometric characteristics with certain biometric sensors associated with client device 120.

In various embodiments depicted in FIG. 1, database 136 operates to store data as a security provider for institution 130 and client device 120. More specifically, database 136 stores (i) biometric data of a user, (ii) application logic and (iii) at least one one-time password. To illustrate various aspects of the present invention, examples of a security provider are presented in which a security provider represents one or a combination of a database and a security system, are presented. However, embodiments of security provider are not limited thereto. In various embodiments, a security provider encompasses any computing resource, or combination of computing resources, that are configured to carry out authentication of an encrypted OTP using the processes described herein. Embodiments of the present invention recognize that computing environment 100 may include other forms of computing devices that are known in the art.

In various embodiments, database 136 stores biometric data for individuals and entities that are enrolled in institution logic 134. For example, database 136 can associate usernames, passwords, permissions, and various biometric characteristics with enrolled individuals and entities as part of a user profile. Accordingly, the entity or organization represented by institution 130 may capture biometric characteristics (which include, but are not limited to any one of, or a combination of: fingerprints, finger vein, palm vein, facial recognition, deoxyribonucleic acid ("DNA"), hand geometry, retina, eye color, odor/scent, typing rhythm, gait, and voice) during an initial enrollment process. Embodiments of the present invention represent that different types of biometric data may require different levels of variability in the mapped biometric data, i.e., margins of error that are built into the representation of the biometric data. In some embodiments, multiple types of biometric data are combined to reduce the reliance on such margins of error. For example, one embodiment uses both fingerprints and finger vein patterns when generating biometric representations of the user. In this embodiment the finger veins and the finger prints are leveraged, i.e., their respective locations compared to one another, to help account for differences in the angle of the finger when the biometric data is gathered. In one such embodiment, both of the biometric maps, which are respectively generated at client device 120 and stored on institution 130, are modified to be centered on a three dimensional axis based on the finger veins of the user. In other words, both institution 130 and client device 120 have a common frame of reference, e.g., a stored map of the finger veins of the user, to which fingerprint data is correlated. As such, the margin of error that results from variation in the angle of the finger when the fingerprint is read at client device 120 is accounted. Thus, if the same user supplies the same fingerprint that is stored at institution 130, then the resulting biometric data will match, and the decryption will proceed since the decryption data will correlate to the encryption data. In general, a successful decryption, as used herein, requires that an encrypted OTP be decrypted such that the original OTP is generated from the encrypted version of the OTP. The user profile can also identify various authentication methods that the user selects. For example, one institution may select fingerprint recognition as a preferred method while another institution may select facial recognition as a preferred recognition method when given a choice during or subsequent to the enrollment process. More generally, database 136 is a data repository that institution logic 134 can access to, among other things, authenticate a requestor utilizing data stored therein. In some embodiments, database 136 may be written to and read by programs and entities outside of the computing environment 100 in order to populate the repository with credentials of enrolled individuals and entities. Additionally, database 136 may store one or more parameters of client device 120 and/or biometric sensor 122 obtained via enrollment process and/or previous requests to access institution 130.

In various embodiments of the present invention, client device 120 is a computing device that can be a standalone device, a server, a laptop computer, a tablet computer, a netbook computer, a personal computer (PC), a desktop computer, or a video game console. In another embodiment, client device 120 represents a computing system utilizing clustered computers and components to act as a single pool of seamless resources. In general, client device 120 can be any computing device or a combination of devices with access to institution application 132, institution logic, database 136, biometric sensor 122, client logic 124, and client application 126, and is capable of executing institution application 132, institution logic, client logic 124, and client application 126. In general, client device 120 represents a computing device that can capture biometric tokens via biometric sensor 122 and communicate with institution 130 such that a user of client device 120 (i.e., a requestor) can request a commercial transaction with institution 130. Accordingly, client application 126 operates to transmit commercial transaction requests to institution 130 and configure client device 120 and/or present any feedback (i.e., coaching) that client device 120 receives from institution logic 134 in response to the commercial transaction request. In some embodiments, client application 126 also represents one or more elements of institution logic 134. For example, client application 126 can include functionality for determining whether or not a biometric token can be utilized to create a decryption key and coaching a user of client device 120, as described herein. Client application 126 can also represent a user interface ("UI") that operates to provide a UI (e.g., a graphical interface ("GUI")) to a user of client device 120. In certain such embodiments, the UI of client application 126 operates to receive user input from the user, thereby enabling the user to interact with client application 126 executing on client device 120. In certain such embodiments, the UI of client application 126 can also operate to enable the user to access and/or interact with institution 130 through the authentication of the user via institution logic 134. In certain such embodiments, it is to be understood that computing environment 100 can include a plurality of client device 120 without departing from the scope of the present invention.

In various embodiments, biometric sensor 122 can represent a camera, a microphone, a fingerprint sensor, a hand sensor, or any other sensor that can generate a biometric token that represents a respective aspect of the user of client device 120. In one example, biometric sensor 122 is a smartphone camera that is compatible with facial-recognition algorithms and that can generate an image of the face of the user of client device (i.e., a biometric token) that can facilitate a commercial transaction request by enabling institution logic 134 to authenticate the user of a commercial transaction request. In another example, biometric sensor 122 can represent a fingerprint scanner that is integrated a computing device (i.e., smartphone, tablet, or PC) and that similarly facilitates commercial transaction requests by enabling institution logic 134 to authenticate the user of a commercial transaction request. Client device 120 can include or communicate with any number and/or any type of biometric sensor that can generate biometric tokens utilized by institution logic 134.

Figure 2:
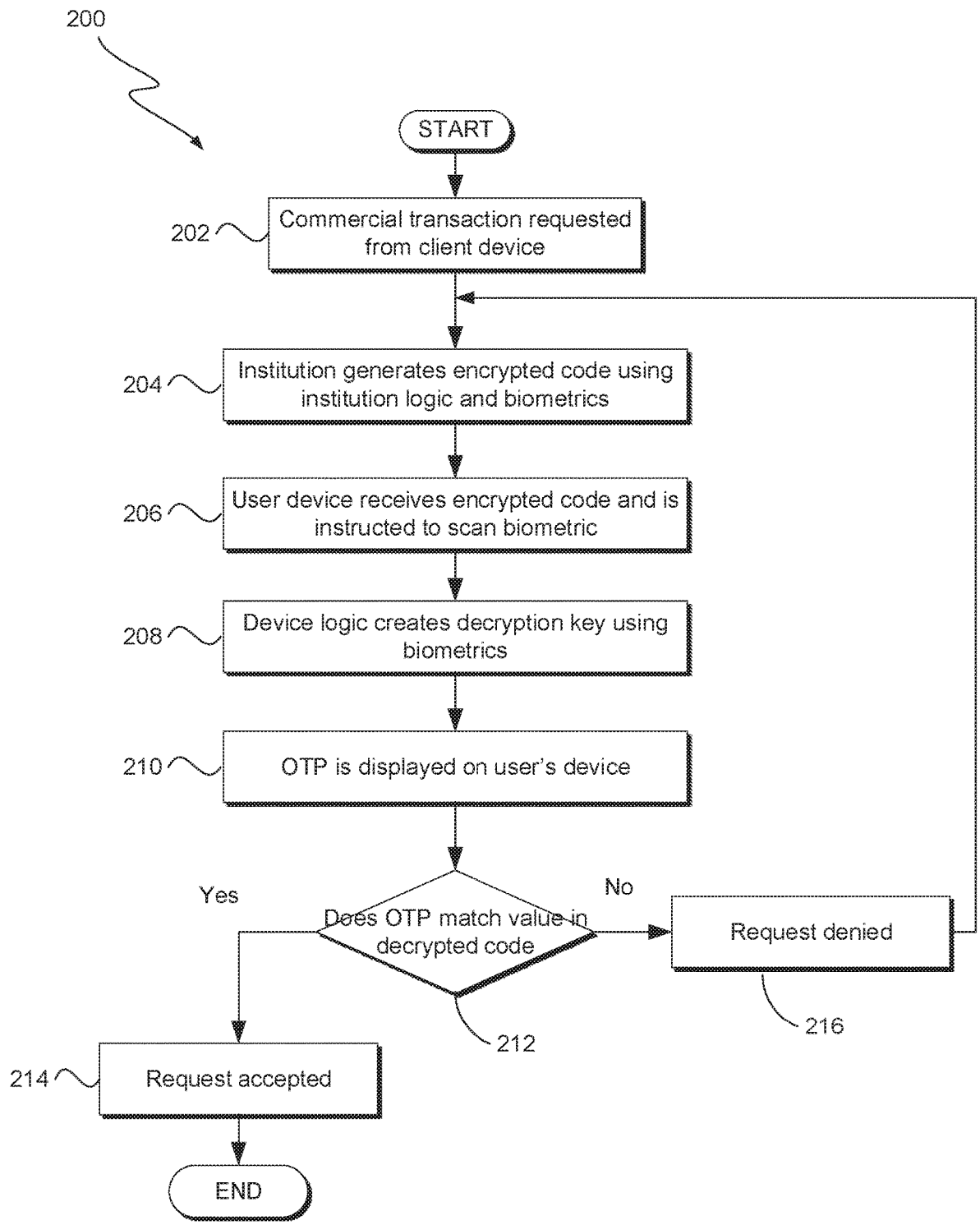
FIG. 2 illustrates operational processes of executing a biometrically encrypted access policy, on a computing device within the environment of FIG. 1, in accordance with an exemplary embodiment of the present invention.

FIG. 2 is a flowchart depicting operations for executing a decryption system for a biometric encrypted OTP in computing environment 100, in accordance with an illustrative embodiment of the present invention. More specifically, FIG. 2 depicts combined overall operations, 200, of client logic 124 and institution logic 134 executing on client device 120 and institution 130, respectively, to manage access to confidential and personal information stored on database 136 of institution 130. In some embodiments, however, operations 200 represents logical operations of client application 126, wherein interactions between institution logic 134 of institution 130 and client application 126 and/or biometric sensor 122 of client device 120 represent interactions between logical units executing on client device 120. It should be appreciated that FIG. 2 provides an illustration of one implementation and does not imply any limitations with regard to the environments in which different embodiments may be implemented. Many modifications to the depicted environment may be made. In one embodiment of flowchart 200, the series of operations can be performed in any order. In another embodiment, the series of operations, of flowchart 200, can be performed simultaneously. Additionally, the series of operations, in flowchart 200, can be terminated at any operations. Additionally, any operation, of flowchart 200, can be resumed at any time.

In one embodiment, responsive to receiving a commercial transaction request from a client device (i.e., from a user of client device 120; operation 202), institution 130 operates to generate an encrypted one-time password ("OTP") using biometric data (i.e., institution logic 134 and database 136; operation 204) and transmit the encrypted OTP to a client device to be decrypted (i.e., client device 120, biometric sensor 122, and client logic 124). Embodiments of the present invention recognize that (i) there are a variety of alternate ways in which institution 130 may be prompted to generate and send an encrypted one-time password ("OTP") using biometric data and (ii) that such variety is encompassed by embodiments herein. In operation 202, client device 120 communicates data with institution 130. In some embodiments, client device 120 communicates data with institution 130 through network 110. In other embodiments, client device 120 can directly communicate data with institution 130. In some embodiments, the commercial transaction request is based, at least in part, on the biometric data stored on database 136.

In one embodiment, client device 120 requests a commercial transaction with institution 130. In another embodiment, institution 130 presents client device 120 with a commercial transaction. Responsive to receiving a request to perform commercial transaction, institution 130 generates a one-time password ("OTP") and an encryption code. In certain embodiments, the encryption code includes a hash function that is applied by institution 130 to the OTP to generate an encrypted version of the OTP.

In some embodiments, client device 120 requests a commercial transaction with institution 130 to authenticate a user login. In other embodiments, client device 120 requests a commercial transaction with institution 130 to authorize a user transaction.

In one embodiment, client device 120 communicates with institution 130 to request a commercial transaction. In other embodiments client device 120 can communicate with institution 130 through network 110. In one example, client device 120 requests institution 130 to generate an OTP to authenticate the user requesting the commercial transaction. Institution logic 134 operates to generate an OTP based, at least in part, on the commercial transaction request by a user of client device 120. The present invention recognizes that an algorithm generates a pseudo-random sequence of codes based on the current time to create an OTP. Further, institution logic 134 operates to generate an OTP based, at least in part, on the level of commercial transaction request by the user of client device 120. For example, the user of client device 120 requests a high-level commercial transaction, institution logic 134 operates to generate an OTP of at least ten digits. Alternatively, the user of client device 120 may request a low-level commercial transaction, institution logic 134 operates to generate an OTP of at least six digits. Select embodiments of the present invention provide for the selection of a password length and character composition for an OTP based on one or more requirements associated with a given type of transaction. Based on the type of transaction, such embodiments may further select a type of encryption or specific type of biometric information to use for encryption of the OTP. Additionally, client device 120 requests institution 130 to generate an encryption code using institution logic 134. In another embodiment, client device 120 requests institution 130 to generate an OTP and either generate or select an encryption code within a predetermined period of time. In some such embodiments, a plurality of encryptions is available and are selected based on, for example, a type of request that is received. For example, the OTP is generated, and the encryption code is selected within thirty seconds of one another, wherein the encryption code is selected based on the request being an online transaction received via a smart phone. In another embodiment, the encryption code is updated, modified or otherwise generated periodically. By replacing the encryption code, or by leveraging multiple possible encryption codes, another layer of security may be added to various embodiments. In some such embodiments, institution application 132 and client application 126 are synchronized such that both applications are using the same encryption code at a given time. For example, institution application 132 and client application 126 are configured to update their respective encryption codes in the same manner at 3 am every day. In another example, the OTP is generated but a bottleneck in the system prevents the generation of the required encryption code within the time-period. In response, institution 130 disposes of the initial OTP and generates a new OTP and another encryption code within a subsequent time period. In some embodiments, client device 120 requests institution 130 to generate an encryption code.

In one embodiment, institution 130 represents one or more of: a financial institution that receives a commercial transaction from client device 120. For example, a commercial transaction request may represent a request to view an account balance, update personal information (e.g., a user profile), transfer funds (e.g., between personal accounts, third-party accounts, commercial accounts), or utilize another service of the financial institution via a website application (i.e., an "app" on a mobile electronic device or other computational device(s)). In another embodiment, institution 130 represents a commercial institution and the commercial transaction request represents one or more of: a request to authorize an account transaction, update personal information (e.g., a user profile), or utilize another service of the commercial institution via a website application (i.e., an "app" on a mobile electronic device or other computational device(s)). Embodiments recognize that a variety of institutions may provide OTPs to clients and that a variety of requests may initiate the generation, encryption, and transmission of the encrypted OTP to a client.

In operation 204, based on the context of the commercial transaction request, the class of biometric data stored, and any relevant user credentials and/or user preferences, institution logic 134 generates an OTP and an encrypted code using requestor's stored biometric data on database 136. In one example, institution application 132 receives a biometric token (i.e., from client device 120) and communicates the biometric token to institution logic 134 to generate a unique identification (ID). Upon receiving the biometric token from institution application 132, institution logic 134 operates to generate a unique identification from the biometric token. In one example, institution logic segments the biometric token (e.g., isolation of user's iris, fingerprint, facial features, voice, or palm), upon determining the boundary of the biometric token, institution logic 134 performs normalization on the biometric token. In a second example, institution logic 134 operates to transform the biometric token texture from cartesian coordinates (X, Y) into polar coordinates (r, φ). In various embodiments, institution logic 134 operates to transform the biometric token texture of user's fingerprint and converts the biometric token data from cartesian coordinates (X, Y) to polar coordinates (r, φ). In some embodiments, institution logic 134 can transform the biometric token texture of user's iris and converts the biometric token data from cartesian coordinates (X, Y) to polar coordinates (r, φ). Based off the polar coordinates, institution logic 134 binarizes the biometric token and translates the biometric token data into "0's" and "1's."

In some embodiments, institution logic 134 operates to binarize the user's fingerprint and translates the biometric data of the fingerprint into "0's" and "1's," where institution logic 134 determines the orientation of the local ridge of the user's fingerprint, the local ridge orientation is quantized, fingerprint regularization filtering is applied, and finally, the convex threshold detects the local ridge. In another embodiment, institution logic 134 operates to binarize the user's iris, by removing the noise pixels (i.e., eyelashes) from the biometric token. Institution logic 134 transforms the biometric token by applying thresholding techniques. For example, all of the pixels that have an intensity that is greater than the threshold are converted into black on the grayscale (e.g., "1"), and all those pixels with an intensity lower than the threshold are converted into white on the grayscale (e.g., "0").

In a third example, institution logic 134 operates to extract the skeleton from the biometric token image. Based on the operations as previously mentioned, and persons of ordinary skill in the art will understand that the skeleton can be seen as a one-pixel thick line through the middle of an object which preserves the topology of that object. Institution logic 134 executes a thinning algorithm to delete extraneous pixels local to the skeleton of the biometric token image. In some embodiments, institution logic 134 operates to thin the biometric token of user's fingerprint, by utilizing iterative boundary removal executing a parallel algorithm to independently delete pixels in the $n^{th}$ iteration.

In a fourth example, institution logic 134 operates to extract the core point from the user's biometric token, mark the minutiae location and angles, remove spurious minutiae, extract coordinates and orientation angle of minutiae, generate a matrix (e.g., N*3) of the extracted minutiae data of the biometric token, and lastly, store the matrix as a unique identification for the user on database 136.

In various embodiments, institution logic 134 operates to generate a plurality of biometric tokens and/or matrices in response to the level of security required for the commercial transaction. For example, user requests a transfer of a high-level commercial transaction, institution logic 134 operates to require the user of client device 120 to provide one or more biometric tokens for institution 130 to authenticate the commercial transaction request made by client device 120.

Institution logic 134 generates an OTP utilizing a time representation. In another example, institution logic 134 generates an OTP. In another example, the encrypted code is generated by institution logic 134 by executing the unique identification matrix with the time representation located on institution application 132. In a more specific example, institution logic 134 generates an encrypted code by taking a matrix (e.g., N*3) of the unique identification matrix against the time representation (e.g., 3*1) to create a matrix (e.g., N*1). Institution logic 134 executes a sequence of hashes based on, at least in part, on the N*1 matrix to encrypt (i.e., encrypted matrix) the OTP that institution logic 134 generated. Institution logic 134 encrypts an OTP with the unique identification matrix and the encrypted OTP is transmitted to client device 120 for decryption and authentication utilizing client logic 124 and biometric scan data (operation 206).

In operation 204, which provides that institution 130 generates an encrypted code using institution logic 134 from biometric data stored on database 136. In one embodiment, institution application 132 requests biometric data for a user from database 136. In another embodiment, institution application 132 can extract ID for a user from database 136. Institution application 132 executes institution logic 134 on institution application 132 to generate an OTP and utilizes unique identification matrix to encrypt the OTP. After receiving a commercial transaction request from client device 120, institution application 132 executing institution logic 134, institution logic 134 operates to apply a time representation authentication against the unique identification matrix. People with ordinary skill in the art, and embodiments of the present invention, recognize that the time representation authentication include the values of the day, month, year, minute and hour, and can represent any combination of the previously mentioned values of time. In one example, the time representation authentication can represent a matrix (e.g., 3*1) and institution logic 134 executes time representation authentication against the unique identification matrix, to generate a matrix (e.g., N*1). Based on the value of the matrix, institution logic 134 applies the unique identification matrix, as recognized above (N*1), pattern to encrypt an OTP generated by institution logic 134. Embodiments of the present invention recognize, that the OTP and unique identification matrix can be generated at any given time. Additionally, embodiments of the present invention recognize that the encrypted OTP is communicated to client device 120 and can only be accessible by the user of client device 120 for a specified amount of time. In general, people with ordinary skill in the art, and embodiments of the present invention, recognize that the specified amount of time is limited based on the format of time applied. In one embodiment that uses a time format of YYYY/MM/DD/HH, the specified amount of time can be no greater than one hour from when the encrypted OTP is generated. In one embodiment, the HH represents a next one-hour time period from the current hour, e.g., if it is 3 pm, then the next hour period would be entered as 4 pm. As such, the resulting encryption and decryption matrix would both have the same time representation.

In some embodiments, the commercial transaction requested by client device 120 may not require an OTP and encrypted code to authenticate the user. In addition to this embodiment, institution 130 may not generate an OTP and/or an encrypted code using pattern logic. In one example, client device 120 communicates a commercial transaction request with institution 130, and institution 130 may not generate an OTP and/or an encrypted code.

In operation 206, institution 130 transmits data to client device 120 through network 110. In some embodiments, institution 130 can directly transmit data to client device 120. In one, institution 130 transmits an encrypted OTP to client device 120 utilizing network 110. In addition, client device 120 executes the requested encrypted OTP for validation.

Based on the transmission of data from institution 130, client device 120 validates the transmission utilizing client application 126 (operation 206) based on inclusion of a certificate in the transmission. Client application 126 validates the integrity of the data received from institution 130 and executes client application 126. In one example, client application 126 instructs a user to scan biometric utilizing biometric sensor 122. In one, client device 120 instructs a user to scan a physiological characteristic of the user, utilizing biometric sensor 122, to authenticate the user of client device 120. In a more specific example, the user scans a physiological characteristic consisting of, but not limited to, fingerprint, finger vein, palm vein, facial recognition, deoxyribonucleic acid ("DNA"), hand geometry, retina, or odor/scent utilizing biometric sensor 122 to authenticate the user.

In another embodiment, client device 120 can instruct the user to scan a behavioral characteristic of the user utilizing biometric sensor 122 to authenticate the user if client device 120. In a more specific example, the user can scan a behavioral characteristic consisting of, but no limited to, typing rhythm, gait, or voice with biometric sensor 122 to authenticate the user.

In some embodiments, client device 120 can authenticate a user with a static username and password.

Upon receiving the biometric scan from biometric sensor 122 (i.e., from a user of client device 120; operation 206), client device 120 communicates the biometric scan to client logic 124. In one example, client logic 124 recognizes the biometric data to authenticate the user of client device 120. In another embodiment, client logic 124 can request the biometric scan data from biometric sensor 122, and biometric sensor 122 can transmit the biometric scan data to client logic 124. In one embodiment, client logic 124 generates a decryption key based on the biometric data generated by the biometric (i.e., to decrypt encrypted OTP; operation 208).

In operation 208, which provides that client logic 124 creates a decryption key, to decrypt encrypted code from institution logic 134, utilizing biometric scan data from biometric sensor 122. In one embodiment, institution application 132 communicates an encrypted OTP to client device 120. Client device 120 notifies user and requests user to scan biometric characteristic by utilizing biometric sensor 122, wherein biometric sensor 122 communicates biometric scan data to client application 126. The requested biometric scan requests same type of biometric data that was used to encrypt the OTP. For example, if a fingerprint was used to encrypt the OTP, then a fingerprint scan of that same finger is requested, via biometric sensor 122. Client application executes client logic 124 to create a decryption key utilizing user's biometric scan data.

In one embodiment, client logic 124 generates a decryption key utilizing biometric scan data acquired through biometric sensor 122. As recognized above, client logic 124 operates to generate a decryption key to decrypt an encrypted OTP generated by institution logic 134, by executing the steps recognized in operation 204.

In one example of the invention, client logic 124 operates to segment the biometric token (e.g., isolation of user's iris, fingerprint, facial features, palm, or voice), upon determining the boundary of the image of biometric scan data, client logic 124 performs normalization on the biometric scan data. Client logic 124 operates to normalize the biometric scan data by transforming the biometric scan data texture from cartesian coordinates (X, Y) into polar coordinates (r, φ). In various embodiments, client logic 124 operates to transform the biometric token texture of user's fingerprint and converts the biometric token data from cartesian coordinates (X, Y) to polar coordinates (r, φ). In some embodiments, client logic 124 can transform the biometric token texture of user's iris and converts the biometric token data from cartesian coordinates (X, Y) to polar coordinates (r, φ). Based off the polar coordinates, client logic 124 binarizes the biometric token and translates the biometric token data into "0's" and "1's."

In some embodiments, client logic 124 operates to binarize the user's fingerprint and translates the biometric data of the fingerprint into "0's" and "1's," where client logic 124 determines the orientation of the local ridge of the user's fingerprint, the local ridge orientation is quantized, fingerprint regularization filtering is applied, and finally, the convex threshold detects the local ridge. In another embodiment, client logic 124 operates to binarize the user's iris, by removing the noise pixels (i.e., eyelashes) from the biometric token. Client logic 124 transforms the biometric token by thresholding. In one example, all pixels that have an intensity that is greater than the threshold are converted into black on the grayscale (e.g., "1"), and all pixels with an intensity lower than the threshold are converted into white on the grayscale (e.g., "0").

In a third example, client logic 124 operates to extract the skeleton from the biometric scan data. Based on the operations as previously mentioned, and persons of ordinary skill in the art will understand that the skeleton can be seen as a one-pixel thick line through the middle of an object which preserves the topology of that object. Client logic 124 executes a thinning algorithm to delete extraneous pixels local to the skeleton of the biometric scan data. In some embodiments, client logic 124 operates to thin the biometric token of user's fingerprint, by utilizing iterative boundary removal executing a parallel algorithm to independently delete pixels in the $n^{th}$ iteration.

In a fourth example, client logic 124 operates to extract the core point from the user's biometric token, mark the minutiae location and angles, remove spurious minutiae, extract coordinates and orientation angle of minutiae, and lastly, generates a matrix (e.g., N*3) of the extracted minutiae data of the biometric scan data. Using the current time, client logic 124 generates a decryption matrix. For example, client logic 124 generates an N*1 matrix by multiplying the current time with the N*3 matrix. The result is then used to decrypt the encrypted OTP.

Client logic 124 generates a single decryption key for every commercial transaction request and encrypted OTP. Client logic 124 operates to apply a time representation authentication against the decryption matrix. People in the ordinary skill in the art and embodiments of the present invention, recognize that the time representation authentication include the values of the day, month, year, minute and hour, and can represent any combination of the previously mentioned values of time. In one example, the time representation authentication can represent a matrix (e.g., 3*1) and client logic 124 executes time representation authentication against the decryption matrix, the resulting value represents a matrix (e.g., N*1). Based on the value of the matrix, client logic 124 applies the decryption matrix pattern to decrypt an encrypted OTP generated by institution logic 134.

In another embodiment, client logic 124, at least in part, operates to decrypt an encrypted OTP generated by institution logic 134. Utilizing the decryption matrix, client logic 124 applies the decryption matrix against an encrypted OTP to decrypt the data. In one specific example, client logic 124 executes a decryption matrix that represents a cipher to decrypt an encrypted OTP that represents an asymmetric encryption. Further, in one example, the decryption matrix is an identical match to the encrypted OTP's matrix, and therefore application of the decryption matrix to the encrypted OTP decrypts the data of the encrypted OTP. In another example, the biometric data supplied by the user does not match the biometric data stored at institution 130 and thus the attempt to decrypt the encrypted OTP fails.

In one embodiment and example, client logic 124 successfully decrypts an encrypted OTP executing decryption matrix. In this example, client logic 124 extracts an OTP from the decrypted data and prepares a graphical representation of the OTP for the user, via client application 126. In another embodiment, client application 126 includes the logic of client logic 124 and executes that logic to extract the OTP from the decrypted data.

In operation 210, client application 126 displays OTP to user on client device 120. In one embodiment, client application 126 instructs user to input OTP into text field of client application 126. In another embodiment, client logic 124 can automatically enter the OTP into text field of client application 126. In one embodiment, OTP is automatically submitted by client application 126 and the requests is thus authorized without further input required from the user. In one embodiment and scenario, a user submits a request via client device 120 and receives a prompt to supply the needed biometric data. The user is unaware of the required OTP for processing the request since client application 126 is configured to handle the decryption and entry of OTPs. As such, in response to the successful decryption of the OTP, client application 126 simply presents the user with an indication that the request has been processed.

In the embodiment depicted in FIG. 2, client application 126 determines whether or not the user of client device 120 is authenticated using the OTP that was submitted to client application 126 (operation 212). While FIG. 2, depicts decision 212 as a binary decision for illustrative simplicity, other embodiments are not limited to identifying one of two validations. In other embodiments, decision 212 represents operations to identify an appropriate validation from among three or more validations.

If client application 126 determines that the decrypted OTP and/or one or more imputed OTP(s) authenticate the user of client device 120 (decision 212, YES branch), client application 126 approves client device 120 request to commercial transaction (operation 214). If client application 126 determines that the decrypted OTP and/or one or more imputed OTP(s) do not authenticate the user of client device 120 (decision 212, NO branch), client application 126 denies the commercial transaction request and notifies client device 120 of the operation (operation 216). If, for example, client application 126 determines that the imputed OTP cannot be validated against the locally stored OTP on institution 130, then client application 126 denies the commercial transaction request and client application 126 submits another commercial transaction request to institution 130 to generate another encrypted code and OTP (operation 216). In some embodiments, client application 126 can submit another commercial transaction request to institution 130 and petition different biometric data be used to generate an encrypted code. In addition to the previous embodiment, client application 126 can submit another request to institution 130 and petition a different OTP be generated using institution logic 134.

Figure 3:
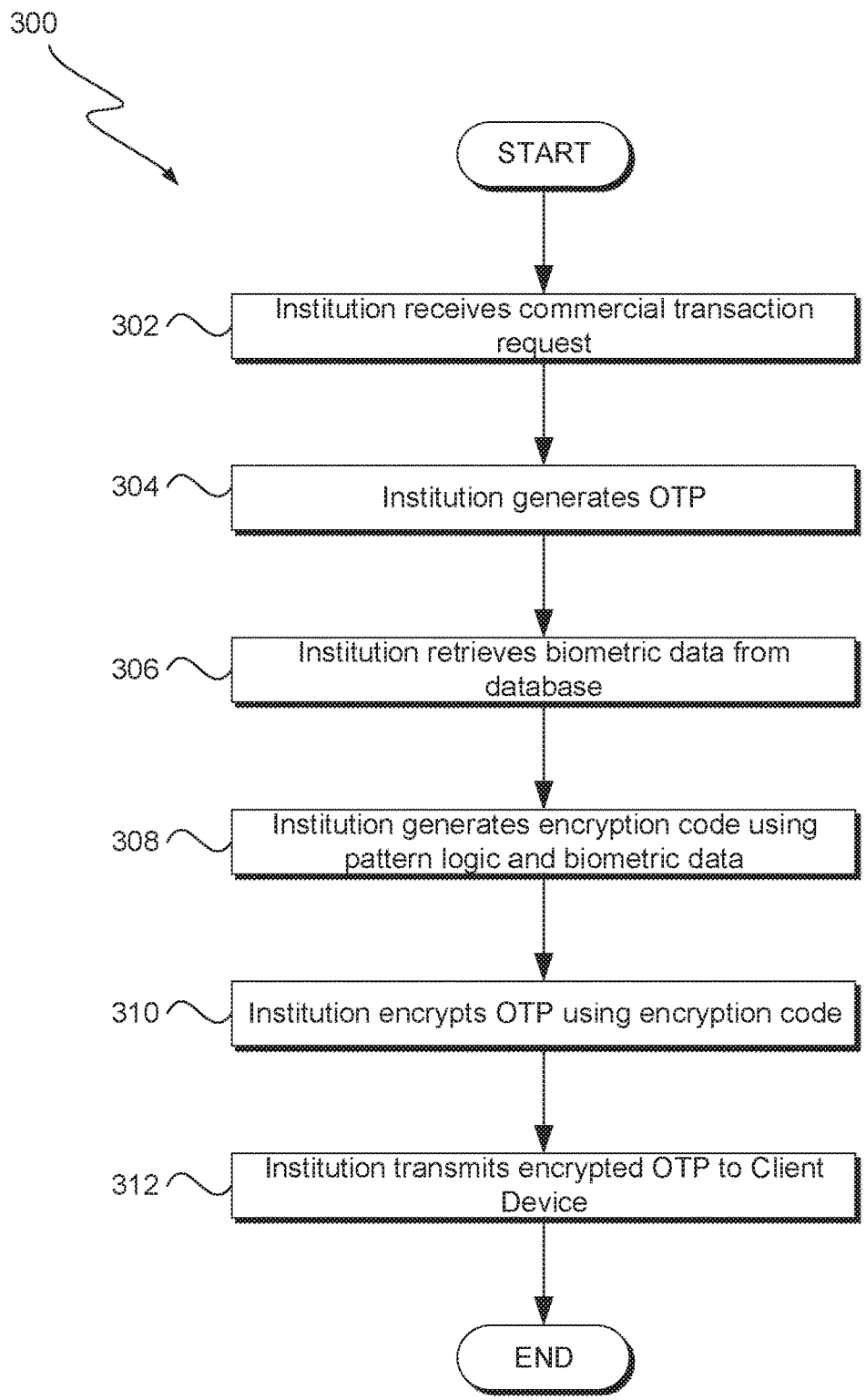
FIG. 3 illustrates operational processes for executing operations on requesting access to a client-supported institution, on a computing device within the environment of FIG. 1, in accordance with an exemplary embodiment of the present invention.

FIG. 3 is a flowchart depicting operations for executing operations on requesting access to a client-support institution within the computing environment 100 depicted in FIG. 1, in accordance with an embodiment of the present invention.

Operations 300 represents logical operations of institution 130 that interact and influence operations 200 of client logic 124, as depicted in FIG. 2. In some embodiments, operations 300 can include one or more elements of operations 200, in which case interactions between operations 200 and 300 represent logic of institution logic 134 and client logic 124.

When a user of client device 120 attempts to access client-supported institution 130 within computing environment 100, client application 126 send a commercial transaction request to institution application 132 executing on institution 130 (operation 302). Institution 130 accepts commercial transaction request from client device 120, and institution application 132 authorizes that user of client device 120 can request such transaction. Institution application 132 transmits a commercial transaction request to institution logic 134 to generate an OTP (operation 304).

In operation 306, provides that institution logic 134 communicate with database 136 and requests database 136 to transmit the user of client device 120 unique identification matrix to institution logic 134. Institution logic 134 receives unique identification matrix from database 136, and institution logic 134 prepares to generate an encrypted code utilizing unique identification matrix.

Institution logic 134 generates an encrypted code utilizing a unique identification matrix and time representation authentication, as recognized above (operation 308).

Institution logic 134 encrypts an OTP with an encrypted code and transmits the encrypted OTP to institution application 132 (operation 310). Institution application 132 transmits the encrypted OTP to client application 126 executing on client device 120 (operation 312). Client application 126 receives encrypted OTP and instructs user of client device 120 to scan biometric characteristic utilizing biometric sensor 122.

Figure 4:
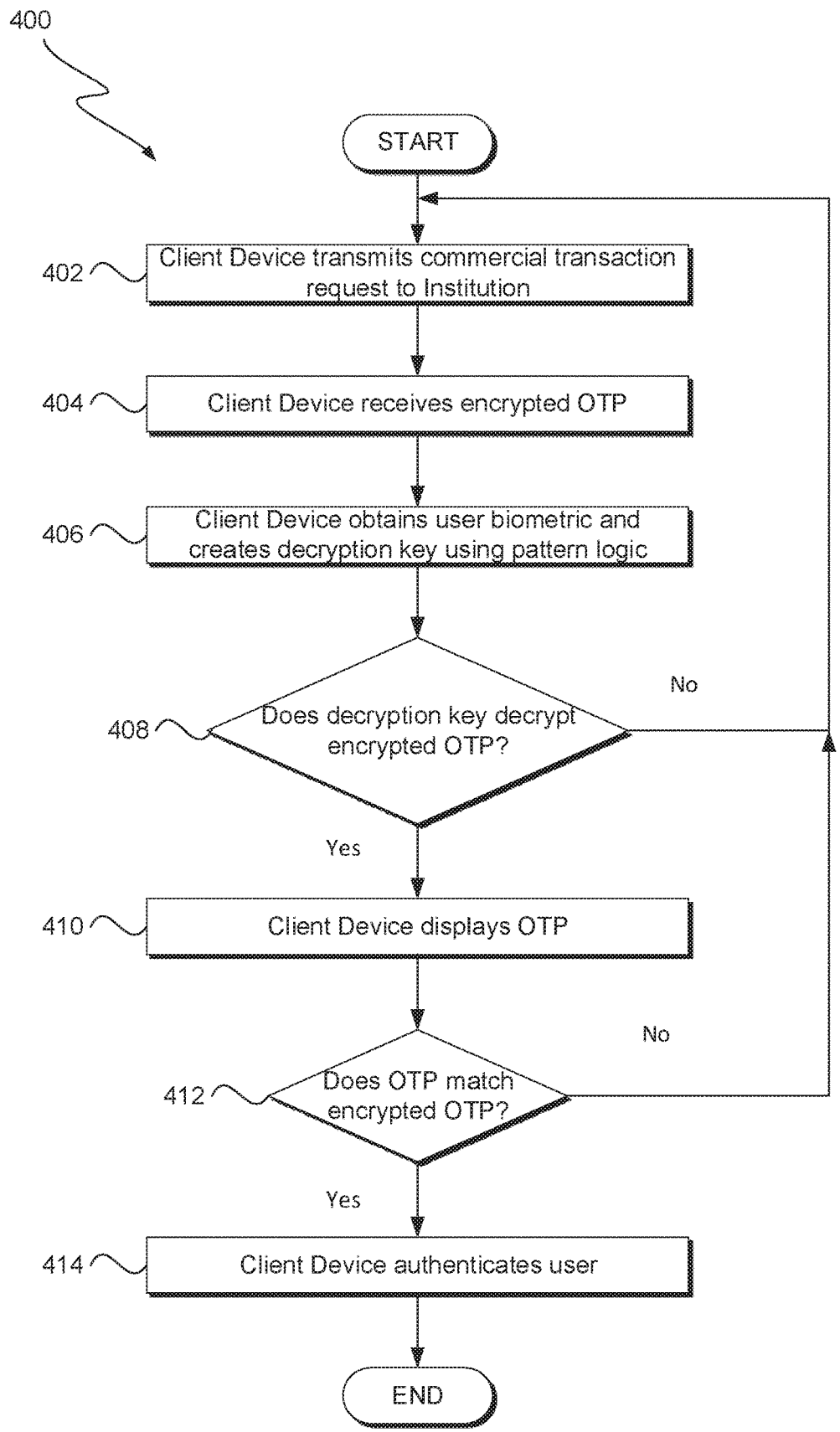
FIG. 4 illustrates operation processes for executing operations on requesting access to a client-supported institution, on a computing device within the environment of FIG. 1, in accordance with an exemplary embodiment of the present invention.

FIG. 4 is a flowchart depicting operations for executing operations on authenticating a user to access a client-supported institution, on a computing device within the environment of FIG. 1, in accordance with an exemplary embodiment of the present invention.

Operations 400 represent logical operations of client application 126 that interact with and influence operations 200 of institution logic 134 and client logic 124, as depicted in FIG. 2. In some embodiments, operations 400 can include elements of operations 200 and operations 300, in which case interactions between operations 200, 300, and 400 represent logic of client device 120 and institution 130.

When a user of client device 120 attempts to access client-supported institution 130 within in computing environment 100, client application 126 send a commercial transaction request to institution application 132 executing on institution 130 (operation 402). Institution 130 accepts commercial transaction request from client device 120, and institution application 132 authorizes that user of client device 120 can request such transaction. As recognized above, client device receives encrypted OTP from institution application 132 (operation 404). As recognized above, client device 120 obtains a biometric scan of user's biometric characteristic utilizing biometric sensor 122. Further, as recognized above, client application executes client logic 124 operating to generate a decryption key based on the biometric scan data obtained from the user's biometric characteristic. As previously described, client logic 124 operates to perform the operations to create an asymmetric decryption key to decrypt the encrypted OTP. Client logic 124 executes logic policy to normalize the biometric scan data image, binarize the biometric scan data image, thin the biometric scan data image, extract the core point of the biometric scan data image, mark the minutiae, remove spurious minutiae, and apply region of interest. Lastly, client logic 124 extracts the coordinates and orientation angle of the minutiae, and client logic 124 generates a matrix (e.g., N*3) of the extracted value. Client logic 124 operates to retrieve a time representation from client application 126. Client logic 124 generates a decryption key by executing a decryption matrix and applying a time representation obtained from client application 126. Client logic 124 transmits decryption key to client application 126, and client application executes decryption key against encrypted OTP to decrypt encrypted OTP (operation 406).

If client application 126 determines that decryption key decrypts encrypted OTP and that the decryption key authenticates the user of client device 120, as discussed in FIG. 2 (decisions 408, YES branch), client application 126 extracts OTP from encrypted OTP. Client device displays OTP to user utilizing client application 126 and instructs user to input OTP into client application for authentication (operation 410). If client application determines that OTP matches the encrypted OTP authenticates the user of client device 120, as discussed in FIG. 2 (operation 412, YES branch). Client device 120 authenticates the user of client device 120 and user is granted access to institution 130 and commercial transaction request is approved (operation 414).

If client application 126 determines that decryption key does not decrypt encrypted OTP and that the decryption key does not authenticate the user of client device 120, as discussed in FIG. 2 (decisions 408; NO branch), client application proceeds through subsequent iterations of operations 402, 404, and 406 and decision 408 with respect to generating one or more updated encrypted OTP(s) and decryption key(s) that satisfy the applicable authentication of user of client device 120, as discussed with respect to FIG. 2. If client application determines that OTP does not match the encrypted OTP and does not authenticate the user of client device 120, as discussed in FIG. 2 (decision 408; NO branch), as recognized above, client application proceeds through subsequent iterations of operations 402, 404, and 406 and decision 408 with respect to generating one or more updated encrypted OTP(s) and decryption key(s) that satisfy the applicable authentication of user of client device 120, as discussed with respect to FIG. 2.

In various embodiments institution 130 represents a security provider executing programming for a biometrically encrypted access policy as described herein. As such, the executed programming generates an encrypted version of a one-time password using (i) biometric data of a user and (ii) the one-time password stored at a security provider that secures data. The executed programming identifies receipt of a decrypted version of the one-time password from a client device of the user. The executed programming authorizes the client device to access a data that is secured by the institution based on a determination of a match between the decrypted version of the one-time password and the one-time password.

In some embodiments, the executed programming responds to the identification of a commercial transaction being initiated between the user device and a commercial institution by intercepting the commercial transaction request from the client device. In some embodiments, the executed programming determines whether execution of the commercial transaction would necessitate access to the data. In some embodiments, the executed programming responds to a determination that execution of the commercial transaction would necessitate access to the data by preventing execution of the commercial transaction until the user device is granted access to the data.

In some embodiments, the executed programming identifies at least one biometric token that is associated with the security provider based, at least in part, on a database structure. In some embodiments, the executed programming causes the database structure to associate each of a plurality of security provider with one or more respective biometric tokens for authentication. In some embodiments, the executed programming executes an encryption logic for the security provider based, at least in part, on the one or more biometric tokens. In some embodiments, the executed programming the encryption logic associates each of a plurality of biometric tokens with at least a first one-time password.

In some embodiments, the executed programming generates a one-time password based, at least in part, on a set of one or more context-based parameters that are associated with one or more biometric tokens. In some embodiments, the executed programming generates a unique identification matrix based, at least in part, on a plurality of biometric tokens that are associated with one or more biometric characteristics. In some embodiments, the executed programming stores the one-time password and unique identification matrix as part of a secured database that is accessible by the security provider.

In some embodiments, the executed programming generates an encrypted version of a one-time password based, at least in part, on an encryption of the one-time password using the unique identification matrix and a given biometric token of the plurality of biometric tokens.

In some embodiments, the executed programming transmits the encrypted version of the one-time password to client device of the user in response to reception of a request to access the data.

In some embodiments, the executed programming sends the encrypted version of the one-time password to the client device in response to identification of a commercial transaction request associated with the client device. In some embodiments, the executed programming authorizes the commercial transaction request based on a match between the decrypted version of the one-time password and the one-time password stored at the institution that secures data.

Figure 5:
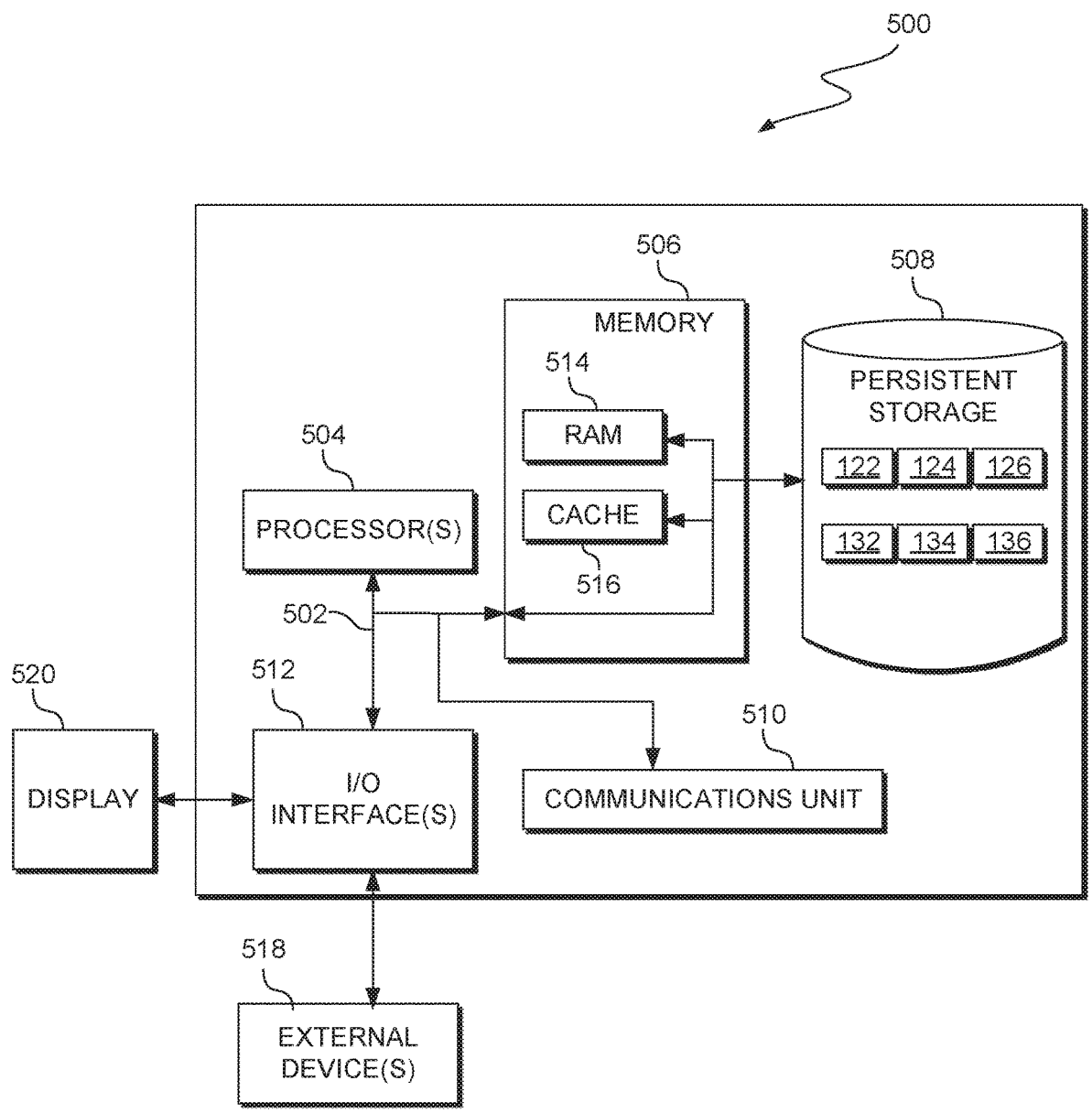
FIG. 5 is a block diagram of components of one or more computing devices within the computing environment depicted of FIG. 1, in accordance with an embodiment of the present invention.

FIG. 5 depicts a block diagram, 500, of components of client device 120 and institution 130, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Client device 120 and institution 130 respectively include communications fabric 502, which provides communications between computer processor(s) 504, memory 506, persistent storage 508, communications unit 510, and input/ output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

Biometric sensor 122, client logic 124, client application 126, institution application 132, institution logic 134, and database 136 are stored in persistent storage 508 for execution and/or access by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including resources of network 110. In these examples, communications unit 510 includes one or more network interface cards. Communications unit 510 may provide communications through the use of either or both physical and wireless communications links. Biometric sensor 122, client logic 124, client application 126, institution application 132, institution logic 134, and database 136 may be downloaded to persistent storage 508 through communications unit 510.

I/O interface(s) 512 allows for input and output of data with other devices that may be connected to client device 120 and institution 130. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., biometric sensor 122, client logic 124, client application 126, institution application 132, institution logic 134, and database 136, can be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) such as, for example, "Smalltalk" and the like may be subject to trademark rights in various jurisdictions throughout the world and are used here only in reference to the products or services properly denominated by the marks to the extent that such trademark rights may exist.

What is claimed is:

1. A method for executing a biometrically encrypted access policy, the method comprising:
   receiving, by one or more processors, biometric scan data of a user;
   normalizing, by one or more processors, the biometric scan data by transforming a texture of the biometric scan data from cartesian coordinates to polar coordinates;
   translating, by one or more processors, the polar coordinates of the normalized biometric scan data into binary code;
   generating, by one or more processors, a unique identification matrix based, at least in part, on the binary code;
   generating, by one or more processors, an encrypted version of a one-time password using (i) the unique identification matrix and (ii) the one-time password stored at a security provider that secures data;
   identifying, by one or more processors, receipt of a decrypted version of the one-time password from a client device of the user; and
   authorizing, by one or more processors, the client device to access data that is secured by an institution based on a determination of a match between the decrypted version of the one-time password and the one-time password.

2. The method of claim 1, the method further comprising:
   responsive to identifying initiation of a commercial transaction between the user device and the institution, intercepting, by the one or more processors, the commercial transaction request from the client device;
   determining, by the one or more processors, whether execution of the commercial transaction would necessitate access to the data; and
   responsive to a determination that execution of the commercial transaction would necessitate access to the data, preventing, by the one or more processors, execution of the commercial transaction until the user device is granted access to the data.

3. The method of claim 2, the method further comprising:
   generating, by the one or more processors, the one-time password based, at least in part, a set of one or more context-based parameters that are associated with the biometric scan data of the user; and
   storing, by the one or more processors, the one-time password and the unique identification matrix as part of a secured database that is accessible by the security provider.

4. The method of claim 1, the method further comprising:
   transmitting, by the one or more processors, the encrypted version of the one-time password to the client device of the user in response to reception of a request to access the data.

5. The method of claim 1, the method further comprising:
   sending, by the one or more processors, the encrypted version of the one-time password to the client device in response to identification of a commercial transaction request associated with the client device; and
   authorizing, by the one or more processors, the commercial transaction request based on a match between the received decrypted version of the one-time password and a stored copy of the one-time password at the security provider that secures data.

6. A computer program product for executing a biometrically encrypted access policy, the computer program product comprising:
one or more computer-readable storage devices and program instructions stored on the one or more computer-readable storage devices, the stored program instructions comprising:
program instructions to receive biometric scan data of a user;
program instructions to normalize the biometric scan data by transforming a texture of the biometric scan data from cartesian coordinates to polar coordinates;
program instructions to translate the polar coordinates of the normalized biometric scan data into binary code;
program instructions to generate a unique identification matrix based, at least in part, on the binary code;
program instructions to generate an encrypted version of a one-time password using (i) the unique identification matrix and (ii) the one-time password stored at a security provider that secures data;
program instructions to identify receipt of a decrypted version of the one-time password from a client device of the user; and
program instructions to authorize the client device to access data that is secured by an institution based on a determination of a match between the decrypted version of the one-time password and the one-time password.

7. The computer program product of claim 6, the stored program instructions further comprising:
responsive to program instructions to identify initiation of a commercial transaction between the user device and the institution, program instructions to intercept the commercial transaction request from the client device;
program instructions to determine whether execution of the commercial transaction would necessitate access to the data; and
program instructions to responsive to a determination that execution of the commercial transaction would necessitate access to the data, prevent execution of the commercial transaction until the user device is granted access to the data.

8. The computer program product of claim 7, the stored program instructions further comprising:
programs instructions to generate the one-time password based, at least in part, on a set of one or more context-based parameters that are associated with the biometric scan data of the user; and
program instructions to store the one-time password and the unique identification matrix as part of a secured database that is accessible by the security provider.

9. The computer program product of claim 6, the stored program instructions further comprising:
program instructions to transmit the encrypted version of the one-time password to the client device of the user in response to reception of a request to access the data.

10. The computer program product of claim 6, the stored program instruction further comprising:
program instructions to send the encrypted version of the one-time password to the client device in response to identification of a commercial transaction request associated with the client device; and
program instructions to authorize the commercial transaction request based on a match between the received decrypted version of the one-time password and a stored copy of the one-time password stored at the security provider that secures data.

11. A computer system for executing a biometrically encrypted access policy, the computer system comprising:
one or more computer processors;
one or more computer readable storage medium; and
program instructions stored on the computer readable storage medium for execution by at least one of the one or more processors, the stored program instructions comprising:
program instructions to receive biometric scan data of a user;
program instructions to normalize the biometric scan data by transforming a texture of the biometric scan data from cartesian coordinates to polar coordinates;
program instructions to translate the polar coordinates of the normalized biometric scan data into binary code;
program instructions to generate a unique identification matrix based, at least in part, on the binary code;
program instructions to generate an encrypted version of a one-time password using (i) the unique identification matrix and (ii) the one-time password stored at a security provider that secures data;
program instructions to identify receipt of a decrypted version of the one-time password from a client device of the user; and
program instructions to authorize the client device to access data that is secured by an institution based on a determination of a match between the decrypted version of the one-time password and the one-time password.

12. The computer system of claim 11, the stored program instructions further comprising:
responsive to program instructions to identify initiation of a commercial transaction between the user device and the institution, program instructions to intercept the commercial transaction request from the client device;
program instructions to determine whether execution of the commercial transaction would necessitate access to the data; and
program instructions to responsive to a determination that execution of the commercial transaction would necessitate access to the data, prevent execution of the commercial transaction until the user device is granted access to the data.

13. The computer system of claim 12, the stored program instructions further comprising:
program instructions to generate the one-time password based, at least, in part, on a set of one or more context-based parameters that are associated with the biometric scan data of the user; and
program instructions to store the one-time password and the unique identification matrix as part of a secured database that is accessible by the security provider.

14. The computer system of claim 11, the stored program instructions further comprising:
program instructions to send the encrypted version of the one-time password to the client device in response to identification of a commercial transaction request associated with the client device; and
program instructions to authorize the commercial transaction request based on a match between the received decrypted version of the one-time password and a stored copy of the one-time password stored at the security provider that secures data.

\* \* \* \* \*